United States Patent
Abramson

(10) Patent No.: US 8,100,084 B1
(45) Date of Patent: Jan. 24, 2012

(54) SYSTEM AND METHOD FOR WEIGHT MANAGEMENT OF ONE OR MORE PETS

(76) Inventor: Michael T. Abramson, Boston, MA (US)

(*) Notice: Subject to any disclaimer, the term of this patent is extended or adjusted under 35 U.S.C. 154(b) by 0 days.

(21) Appl. No.: 12/688,003

(22) Filed: Jan. 15, 2010

(51) Int. Cl.
*A01K 5/00* (2006.01)
*A01K 5/02* (2006.01)

(52) U.S. Cl. ............ 119/51.02; 119/56.1; 119/57.2

(58) Field of Classification Search .......... 119/51.01, 119/51.02, 51.11, 51.12, 51.13, 52.1, 52.4, 119/53, 56.1, 56.2, 57, 57.1, 57.2, 57.5, 57.7, 119/57.92; *A01K 1/10, 5/00, 39/00, 61/02*
See application file for complete search history.

(56) References Cited

U.S. PATENT DOCUMENTS

| | | | |
|---|---|---|---|
| 4,079,699 A * | 3/1978 | Longmore et al. | 119/51.11 |
| 5,433,171 A * | 7/1995 | Ewell | 119/51.5 |
| 6,044,795 A * | 4/2000 | Matsuura et al. | 119/51.02 |
| 6,145,472 A | 11/2000 | Vittuari | |
| 6,367,417 B1 * | 4/2002 | Gal et al. | 119/51.5 |
| 6,446,574 B2 | 9/2002 | Bickley | |
| 6,779,486 B2 * | 8/2004 | Vaags | 119/51.11 |
| 7,124,707 B1 * | 10/2006 | Clarke | 119/51.02 |
| 7,228,816 B2 | 6/2007 | Turner | |
| 7,426,901 B2 | 9/2008 | Turner et al. | |
| 2005/0217591 A1 * | 10/2005 | Turner et al. | 119/51.02 |
| 2007/0193524 A1 * | 8/2007 | Turner et al. | 119/51.02 |

OTHER PUBLICATIONS

NekoFeeder Auto Pet Flyer—Jan. 28, 2009.

* cited by examiner

*Primary Examiner* — David Parsley
*Assistant Examiner* — Thien Thanh Pham
(74) *Attorney, Agent, or Firm* — Michael T. Abramson, Esq.

(57) ABSTRACT

A system and method is described for determining, based on one or more variables, the appropriate amount of food to dispense in order to implement weight management individually tailored to one or more pets. Based on the one or more variables, a predefined weight of food is determined that should be dispensed in a container during a given time interval. If the current weight of the food within the container has reached a threshold weight, then no additional food is added to the container during the given time interval. However, if it is determined that the threshold has not been reached, then more food is added to the container. The process is repeated during the given time interval until the threshold is reached, and then optionally again for additional given time intervals.

28 Claims, 4 Drawing Sheets

SYSTEM AND METHOD FOR WEIGHT MANAGEMENT OF ONE OR MORE PETS

FIELD OF THE INVENTION

The present invention is directed to weight management of one or more pets and, in particular, to managing pet weight through an automated feeding system and method.

BACKGROUND OF THE INVENTION

Pets give joy to millions of people around the world. They can live long lives and even grow up alongside children. Cats, for example, can live to be more than two decades old, all the while climbing, jumping and playing up until the point when they are nearly too old for such activities. However, not all cats appear to have the same vigor throughout their later years. Specifically, adult cats of any age are known to spend most of their time sleeping, eating and then sleeping some more. This could indicate that something may not be right with the cat, and is statistics suggest the problem might be that the cat is overweight.

There are a number of factors contributing to a rise in feline obesity. One factor is that more cats are becoming indoor cats and, as such, they are not getting as much exercise as outdoor cats. Another factor may be boredom, and the ubiquitous practice of pet owners leaving food out at all times may cause eating from boredom as well as hunger. With that being said, many owners overfeed their cats, either because their cats beg for food, or because they do not have a clear idea of just how little food cats really need. As few as six extra pieces of kibble in a single meal may contribute to a cat gaining unwanted weight.

The consequences of feline obesity are serious. Excess body weight may cut a pet's life short. For instance, the risk of death for middle-aged obese cats is nearly three times greater than for cats at their ideal weight. Some studies show that obesity is a risk factor for diabetes mellitus, skin problems, hepatic lipidosis, and lameness. Cats who are overweight are also at increased risk for conditions such as urinary tract disease, problems with anesthesia and other drugs, respiratory difficulty, heat intolerance, impaired immunity, and skin problems. The same applies to dogs (canine obesity) and other pets, generally.

The first step in approaching weight loss in homes with pets is to switch from free-feeding to meal-feeding. This means dispensing the pets' food at a certain number of times per day, then picking up the uneaten food or dirty bowls after the pets have had a chance to eat. However, this can be burdensome to the pet owner, for example, if the pet owner's schedule is unpredictable or if the pet owner travels frequently. Another problem arises when a home has multiple pets, where a pet owner may also have to separate those pets from each other and feed each pet by itself.

One specific problem arises when one or more pets have a special dietary need, such as a home that has a pet that is overweight and/or a pet that is underweight. Without carefully regulating the activities of the two pets or placing the food in different locations for different pets, there is nothing that prevents the overweight pet (or any other animal in the home) from eating the food of the underweight or normal weight pet. One solution to this problem is the use of transmitters to permit and deny access to the food dish. Examples of such transmitters are described by Matsuura et al. in U.S. Pat. No. 6,044,795 entitled, AUTOMATIC FEEDING SYSTEM HAVING ANIMAL CARRIED TRANSMITTER WHICH TRANSMITS FEEDING INSTRUCTIONS TO FEEDER, issued Apr. 4, 2000, as well as Bickley in U.S. Pat. No. 6,446,574 entitled ANIMAL-ACTUATED FEEDER, in addition to Clarke in U.S. Pat. No. 7,124,707 entitled SELECTIVE ANIMAL FEEDING APPARATUS, issued Oct. 24, 2006. The advantage of using such a device, much like an electronic key, is that only one pet may be in possession of such a transmitter and, accordingly, gain access to the food. For example, if there is an overweight pet living with a healthy pet, the healthy pet may have a transmitter, e.g., on its collar, that allows it to gain access to its food when the transmitter comes in close proximity with a receiver. This would prevent the heavier pet from eating the healthy pet's food. A disadvantage of these systems is that they either still require the owner to manually feed the pet, or if food is dispensed automatically, the dispensed food will not include the precise measurement of food required for a healthy diet.

Attempts have been made to overcome the necessity to manually feed pets by using automated feeders, such as the one described by Krishnamurthy in U.S. Pat. No. 6,401,657 entitled, AUTOMATIC PET FOOD FEEDER, issued Jun. 11, 2002 and by Turner et al., in U.S. Pat. No. 7,228,816 entitled ANIMAL FEEDING DEVICE AND METHOD. Such devices use gravity and a rotating auger or screw shaft, which, when rotating, moves food out of a tube into a feeding bowl. One advantage of such devices is that the device automates the feeding process by measuring the amount of food to dispense based upon how many rotations are completed and can be programmed to dispense the food at certain times. However, the disadvantage is that the technique used to measure the food is too inaccurate. For example, as noted above, if as few as six extra pieces of kibble in a single meal may make a pet gain unwanted weight, the screw shaft may be distributing excess amounts of food depending on such factors as the size of the kibble, the size of the screw shaft, how many pieces of kibble are caught in the screw shaft, and the number of times in a day the feeder operates. For instance, some rotations of the screw shaft may catch and dispense 6 pieces of kibble, while 8 pieces of kibble may be caught and dispensed during the next rotation, etc. Additionally, if the pet has not eaten all of the previously dispensed food, the automatic feeder will continue to dispense the same amount of food, thus overflowing of food and over feeding may continue to occur.

One technique, like the one described by Vittuari et al., in U.S. Pat. No. 6,145,472 entitled, AUTOMATIC FEED DISTRIBUTION APPARATUS FOR ANIMALS, issued Nov. 14, 2000, attempts to correct the overflow problem by incorporating an angular potentiometer to determine if there is leftover food the pet has not eaten. For example, a bend allows a detector to lower down to touch the bottom of a food trough (i.e., food dish). The angular movement of the rod would indicate that food is remaining in the food dish. The greater is the angular movement of the rod, the less food that exists in the dish. With this information, the amount of food to be dispensed in the food dish can be tailored based on the leftover food. The advantage of such a system is that it avoids food overflow. However, one disadvantage that remains is the inaccuracy of using a volumetric screw feeder, similar to the ones used in the above-mentioned patents. A second disadvantage is the questionable accuracy of the angular zo potentiometer to precisely determine how much food remains in the food dish. For example, similar to how a car's gas gauge may only estimate the approximate gas level in a gas tank, the angular movement of the rod is only a rough estimation of the amount of food remaining in the food dish. Furthermore, there may be more food in one area of the food dish that is not identified by the rod which is touching a different area of the food dish. Thus, such a system still fails to address the problem of continuously dispensing a healthy amount of food.

Due to the enumerated health risks associated with overweight pets, it is essential that a pet's weight loss be slow and steady. For example, the weight loss should not exceed 2 percent of body weight per week, which for a 15 pound cat is approximately one or two ounces. Furthermore, like people, animals vary between one another and thus their dietary needs may vary as well due to such things as weight, age, activity levels, etc. Thus, because as few as six extra pieces of kibble in a single meal can make a pet gain unwanted weight, and because a pet's weight loss should be gradual and specific to an individual pet, there remains a need for an automatic food dispensing system and method that prevents one or more pets from eating a particular pets' food, but that also dispenses an appropriate amount of food in a way that is carefully determined (e.g., tailored to the pet) and measured for optimal dietary feeding.

SUMMARY OF THE INVENTION

The present invention overcomes the disadvantages of the prior art by providing a system and method for accurately weighing and dispensing an ingestible substance, such as food, to implement weight management of one or more pets (e.g., a cat). In one illustrative embodiment, a pet's food dish (e.g., container) is configured as a scale capable of weighing an amount of food currently in the food dish. A predefined weight of the food to be dispensed in a single serving may be determined by one or more processors based upon one or more variables stored in memory, for example, the type of pet food (e.g., brand, dog, cat), the age of the pet, the weight of the pet, etc., or the predefined weight may be input manually (e.g., via a user interface).

For instance, in one embodiment, the current weight of the food in the food dish is determined. Next, it is determined if the current weight of the food, e.g., in a single serving at a particular meal time, has reached a given threshold, e.g., the predetermined weight of the food to be dispensed within some acceptable error rate or range. If the threshold has been reached, then no additional food needs to be moved into the food dish until the next meal time. However, if the threshold has not been reached, then additional food is moved into the food dish using, for example, a conveyer belt. The process repeats until the threshold is reached for that individual particular meal (e.g., feeding cycle, meal time, etc.).

According to another illustrative embodiment, a pathway from which food is moved becomes increasingly narrow so that the amount of food dispensed into the food dish may be better controlled. For example, the path may be narrowed to a point where the food (e.g., kibble) is advanced into the food dish one-by-one. In another illustrative embodiment, after additional food is added to the food dish, the conveyer belt stops and the weight of all the food currently in the food dish may be weighed to determine if the threshold has been reached. If the threshold is not reached, the belt begins again and the process is repeated. Once the threshold is reached, the conveyer belt stops moving until the next feeding cycle, and as such, stops any additional food from entering the food dish. An additional embodiment may illustratively use a food access device, such as a transmitter and receiver, to regulate which pet may access any particular food dish should there be more than one pet in a home.

Advantageously, the use of access control along with such precise measuring and dispensing of food will allow a pet owner to regulate a pet's diet more accurately and with less hassle to achieve the pet's dietary needs. In turn, the guessing work about determining and/or enforcing how much food should be served and how often the food should be served is eliminated and the healthy eating habit of the pet is better provided.

BRIEF DESCRIPTION OF THE DRAWINGS

The embodiments of the invention may be better understood by referring to the following description in conjunction with the accompanying drawings in which like reference numerals indicate identical or functionally similar elements.

DETAILED DESCRIPTION OF ILLUSTRATIVE EMBODIMENTS

Figure 1:
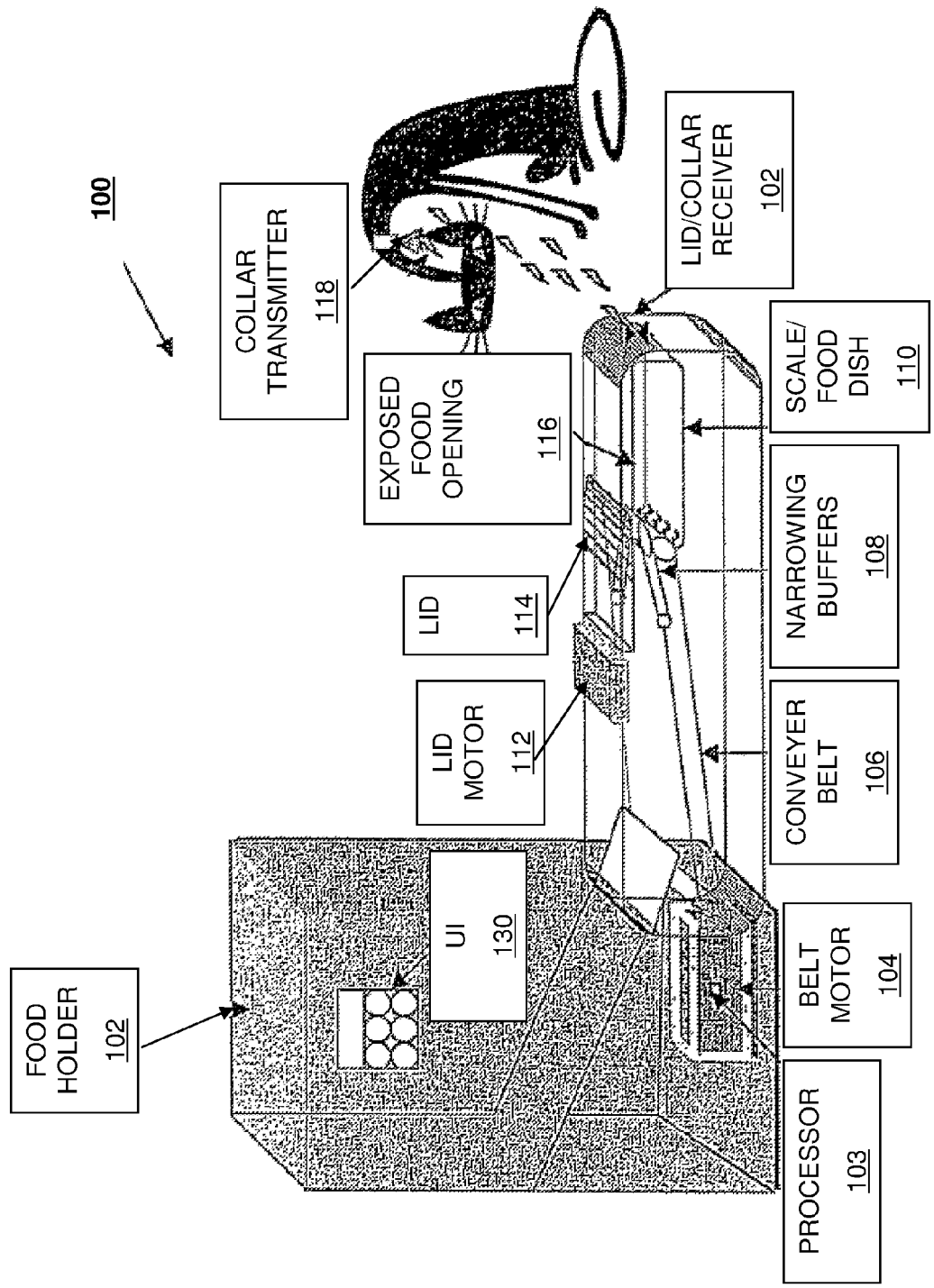
FIG. 1 is a schematic block diagram of an illustrative feeding apparatus that may be advantageously used with the present invention.

FIG. 1 is an exemplary feeding apparatus 100 that may be advantageously used with the present invention. Food holder 102 may be used to hold a plurality of items, such as food bits (e.g., dry or wet), which may be subsequently dispensed to an animal, e.g., a cat or other pet, into food dish 110. It will be understood to those skilled in the art that other types of substances may also be used in the present invention, such as medication or food treats. A pet owner may buy large amounts of pet food and place various amounts of the food (or as much food as can be held) into the food holder 102. The food holder may direct the food to a conveyer belt 106 by gravity and/or other techniques such as vibrating motions. In operation, the conveyer belt 106 may be operated by a belt motor 104 to direct any food on the conveyer belt 106 into the food dish 110. It will be apparent to those skilled in the art that other methods of operating a conveyer belt may be used in accordance with the present invention. It will also be apparent to those skilled in the art that other methods of directing food into the food dish may be used in place of or in addition to a conveyer belt.

Notably, in one embodiment, the current invention may include a water system to dispense water in addition to food. Also, in one embodiment, the food holder 102, as well as the food dish 110, may be configured to provide refrigeration for food requiring colder temperatures. Note further that the current invention may be powered by batteries, an AC adapter, or other methods known to those skilled in the art.

Rather than manually measuring and/or weighing the correct amount of food, the present invention allows for accurate measurement by illustratively using a scale as the food dish 110, as described below. For example, the use of a scale is generally more accurate than the gravity screw feeder or angular bend of the prior art to control the appropriate amount of food dispensed in a food dish (which, as noted, may contribute to the ineffectiveness of weight control). The scale may be as accurate as is needed to dispense the appropriate amount of food within an acceptable error rate.

As the conveyer belt moves food towards the food dish 110, the food may be spread out over the entire width of the conveyer belt. If the food were then to drop into food dish 110, it is possible that an entire row's width of food (i.e., the width of the conveyer belt) may drop in the food dish at one time. To assist with the precision dispensing of a specific amount of food to be placed into the food dish, unlike previous methods of dispensing food such as with a gravity screw feeder, FIG. 1 illustratively shows the conveyer belt leading to narrowing buffers 108.

Figure 2:
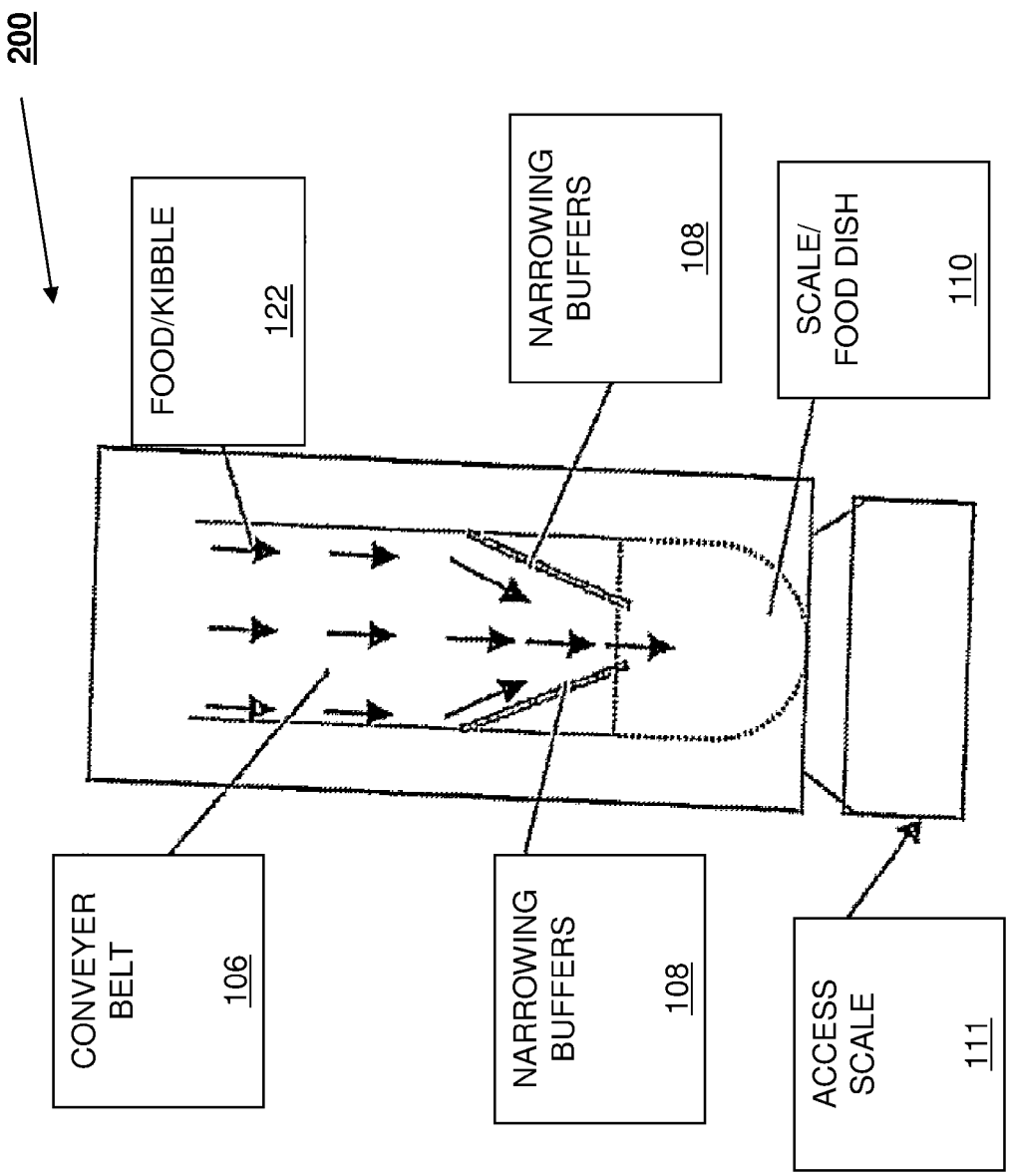
FIG. 2 is a partial schematic block diagram of illustrative narrowing buffers that may be advantageously used with the present invention.

Thus, FIG. 2 illustrates in greater detail the use of narrowing buffers 108. As the food on the moving conveyer belt 106 comes into contact with the narrowing buffers 108, the food is directed into a narrower path. As such, the amount of food 122 dropped or placed into the food dish 110 may be better controlled. It will be understood to those skilled in the art that other methods of controlling and narrowing of the food dispensing may also be used in accordance with the present invention. For example, the conveyer belt may be designed to a specific width allowing the desired control of food dispensing without having to use any narrowing buffers. Additionally, instead of a conveyer belt, food may be moved through the use of gravity and vibrations to move the food down a slope into the food dish.

According to an illustrative aspect of the invention, in operation, a user may select desired information to be displayed via user interface 130 (e.g., Liquid Crystal Display (LCD) or other displaying means and/or user interface means known to those skilled in the art) about the feeding system. For example, information could be displayed on the LCD such as whether more food should be added to the food holder, or if food is being dispensed according to a specific timing interval, or if a different food brand should be used, or how many days a current supply of food will last (e.g., using a scale or other method to determine the current amount of food in holder 102) assuming normal food distribution, etc. Additionally, the user may input into the display of the user interface 130 the brand of cat food, as well as any other relevant information about their cat (e.g., weight, age, desired weight, propensity for hairballs, etc.). This information illustratively may be stored in a memory, such as, disks, flash memory, or any other storage device capable of storing data. The current invention may also have a built in scale (e.g., access scale 111) which may weigh and keep track of the weight (or other statistics) of the pet. The statistics may be printed or downloaded to a computer by such methods as a USB port (not shown), which is well known to those skilled in the art. As will be discussed in greater detail below with reference to FIG. 4, one or more processing devices (e.g., processor 103), in conjunction with an operating system (not shown) may use this information to determine the appropriate amount (e.g., weight) of food to be dispensed, such as based on veterinary guidelines, food company suggestions, or other determining factors and formulas. While only one processor is depicted, any suitable configuration of hardware or software or number of processors may be used without departing from the scope of the present invention. It will be understood to those skilled in the art that a list of different foods and food brands (or other variables/factors) may be preloaded and stored in memory to be selected at a later time by the user. However, it is possible that the above information may be downloaded (e.g., automatically or manually) and/or updated and/or uploaded to the feeding apparatus by, e.g., an internet connection or via a USB device, by a user (e.g., based on food package labeling, independent research, or veterinary advice). It will be further understood that the amount of food to be dispensed may be overridden by the user inputting their own values should the pet owner disagree with how much food the feeding apparatus has determined to dispense. These values may also be stored in memory as different user profiles.

Returning to FIG. 1, a lid 114 is illustratively shown which may be retracted (e.g., removed) to expose food in exposed opening 116. Lid 114 may be retracted via a motor 112, however it will be understood that other methods, such as springs, solenoids, etc., may be used to remove the lid. The lid may thus be used to grant and prevent access to food in food dish 110 (note that food not in the food dish, e.g., on conveyer belt 106, is preferably not accessible). For example, a first pet may be wearing a collar with a transmitter 118. When the transmitter 118 comes into close proximity to a lid/collar receiver 120, the exemplary lid motor 112 may retract lid 114 allowing access to the food in food dish 110. In the example, should the transmitter 118 leave the close proximity of receiver 120, the exemplary lid motor 112 may place lid 114 back to a position covering food dish 110, thereby denying access to any other animal approaching the food. Examples of such allowance and denial of access are shown in the above referenced Matsuura et al. in U.S. Pat. No. 6,044,795 entitled, AUTOMATIC FEEDING SYSTEM HAVING ANIMAL CARRIED TRANSMITTER WHICH TRANSMITS FEEDING INSTRUCTIONS TO FEEDER, as well as Bickley in U.S. Pat. No. 6,446,574 entitled ANIMAL-ACTUATED FEEDER, in addition to Clarke in U.S. Pat. No. 7,124,707 entitled SELECTIVE ANIMAL FEEDING APPARATUS, issued Oct. 24, 2006. It should be noted that the lid may be clear and contain, e.g., holes to allow the pet to see and smell the food. This may help the pet to become better acclimated with the feeding apparatus. Alternatively, the lid may be configured to prevent food odors from leaking out of the food dish or to help preserve the food as long as possible. While the receiver 120 and the transmitter 118 illustratively are placed on the end of the apparatus 100 and on the pet collar respectively, this should be taken only as one possible example, as the receiver and the transmitter may be placed elsewhere in accordance with the present invention.

Figure 3:
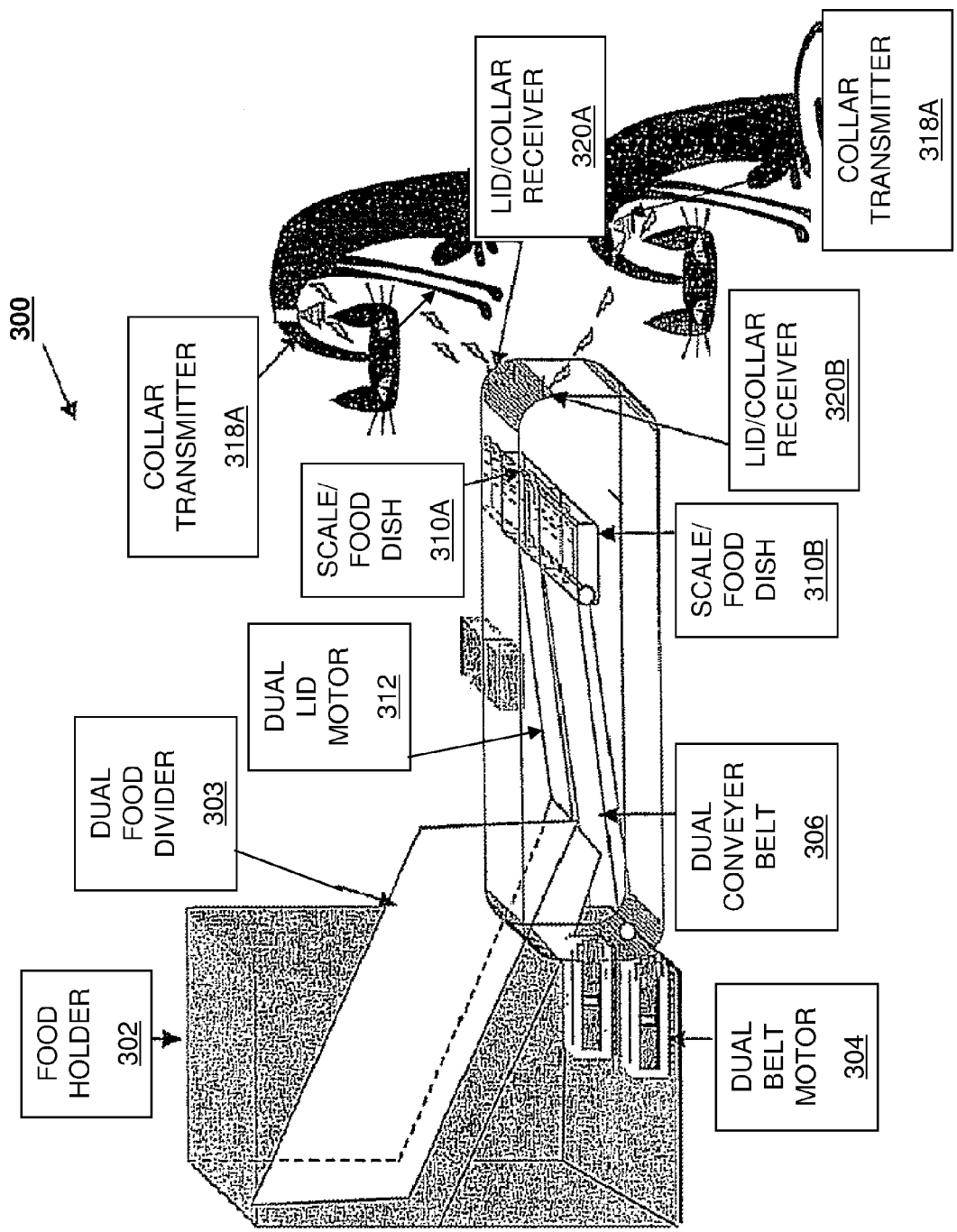
FIG. 3 is a schematic block diagram illustrating another illustrative feeding apparatus for use with one or more pets that may be advantageously used with the present invention.

FIG. 3 illustratively shows another feeding apparatus 300 for use with multiple pets that may be advantageously used with the present invention. Compared to FIG. 1, the apparatus 300 in FIG. 3 is configured to operate with two food dishes, e.g., for two pets. For example, apparatus 300 may comprise a dual food divider 303 in food holder 302 which may be used with the illustrative invention. The divider may be used if the two pets require different types of food. Similarly, each pet may also illustratively have an independent conveyer belt 306, conveyer belt motor 304 or dual conveyer belt motors, lid motor 312 or dual lid motors, lids, as well as independent scales/food dishes 310 *a/b*. Furthermore, each food dish may also be configured with its own lid/collar receiver 320 *a/b* configured to operate in conjunction with its pet specific collar transmitter 318 *a/b*. Similarly to FIG. 1, only the appropriate collar transmitter coming into close enough proximity with the receiver will operate to allow access to the appropriate food dish. For instance, collar transmitter 318*b* will only permit access to food dish 310*b*, wherein collar transmitter 318*a* will only permit access to food dish 310*a*. Alternatively, access to the food dish may be implemented based upon the weight of the animal. For example, according to FIG. 2, the pet may stand on an access scale 111, wherein access to the food would not be granted unless the appropriate weight of the appropriate pet were measured. While only a dual setup is shown in illustrative FIG. 3, it will be understood that any amount of setups may be combined in the present invention to accommodate more than two pets. Additionally, it will be apparent to those skilled in the art that any combination of dual and/or singular components may be used without departing from the intended scope of the present invention.

Figure 4:
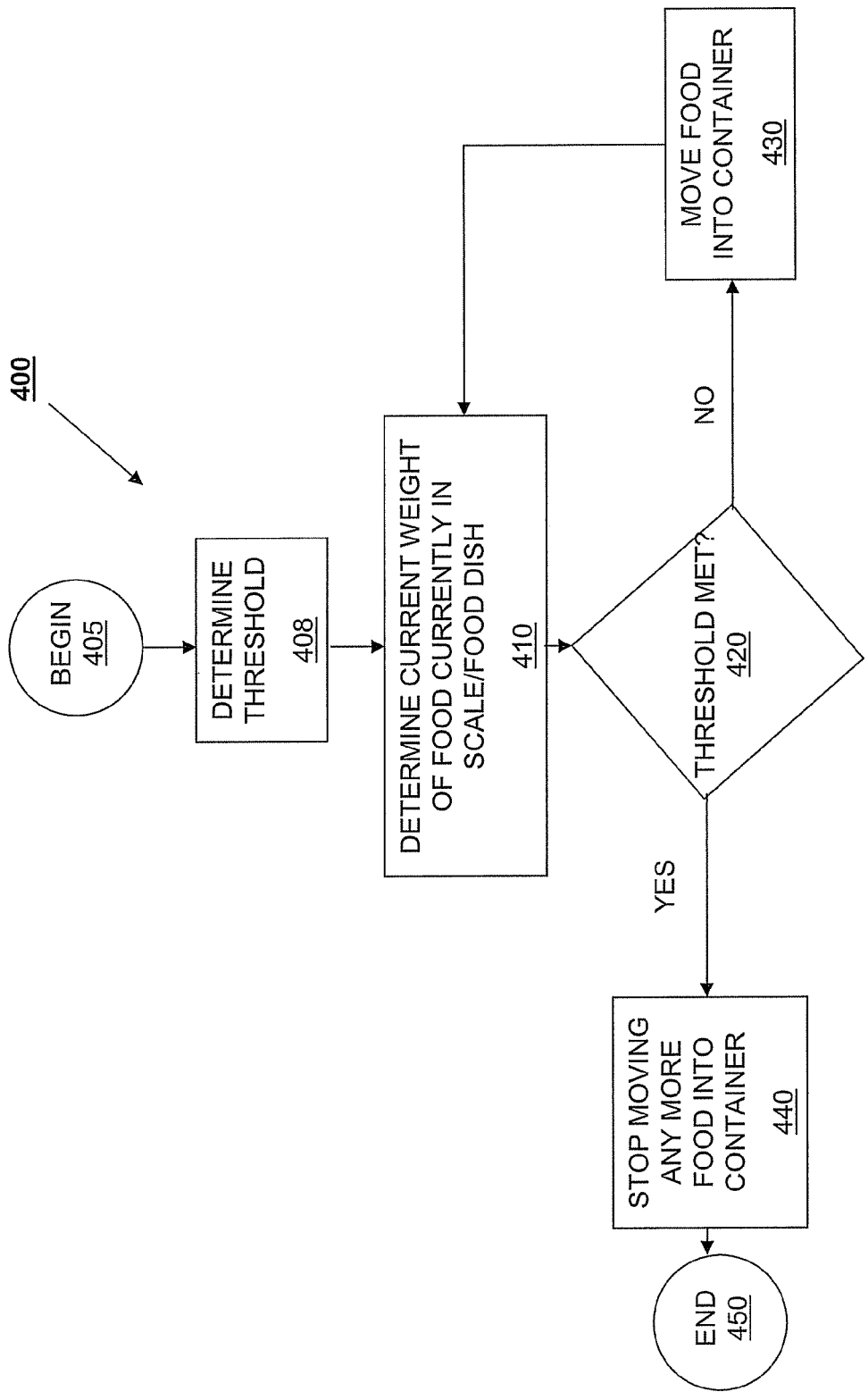
FIG. 4 is a flowchart of an illustrative procedure for dispensing an appropriate amount of a substance that may be advantageously used with the present invention.

FIG. 4 is a flowchart detailing the steps of an illustrative procedure 400 for determining a predefined weight of a plurality of items, such as food kibble bits, to be dispensed in a container (e.g., food dish, scale, etc.) at certain time intervals (e.g., meal cycles) in accordance with an illustrative embodiment of the present invention. The procedure 400 begins in step 405 manually or at a specified feeding time interval (e.g., breakfast, lunch, dinner, etc.). The feeding time interval may be determined, for example, by an internal clock, set by the user or automatically based on predefined schedules (e.g., veterinary suggestions or based on the food manufacturers).

In step 408, a threshold weight is determined. The threshold weight is illustratively a predefined weight of food determined according to different values, such as age and/or weight of the pet, and/or desired weight of the pet, and/or food brand/type, etc., as described above. These values may be used to tailor a diet specifically to an individual pet. For instance, a first pet user may eat brand X cat food, and a second pet user may eat brand Y cat food. While both brand X and brand Y cat food may be appropriate, they may have different kibble sizes, weight, and different nutritional values. As such, the correct amount of food to be dispensed may differ depending on the brand of cat food. In an illustrative embodiment, the apparatus 100 may keep track of such information and/or other statistics to adjust the serving size as appropriate. For example, a kitten may have aged a certain amount of years and may now be considered an adult cat requiring different dietary needs. As such, the apparatus may be aware of this transition from a kitten to an adult cat and may adjust the serving size as appropriate without further user interaction. These values may be selected from a list of values stored in memory or may be manually inputted by a user. Additionally, all or some of these values may be automatically used when certain values, such as the food brand, are selected by the user. Once the threshold weight is determined, it may not be necessary to determine the threshold each time the procedure is implemented assuming the threshold weight does not change.

In step 410, the current weight of any items, e.g., food, that is currently in the scale/food dish 110, if any, is determined. For example, should the procedure begin while there is an amount of food still remaining from a previous feeding time interval, the invention illustratively will take this into account and subtract the remaining food from the predefined amount of food normally dispensed for that particular feeding (i.e., what would be dispensed assuming all food was previously consumed). This is in contrast to simply adding the entire predefined amount of food to the food dish in addition to what was previously left over.

Next, in step 420, it is determined if a threshold weight has been met. The threshold weight may illustratively be met by an exact weight or a weight substantially equal to a threshold weight range of the threshold (e.g., plus or minus the weight of 3 food kibble bits). If it is determined that the threshold has not been met (e.g., the amount/weight of food required for a single serving size, according to the inputted values), then the procedure advances to step 430 where at least one item of the plurality of items (e.g., food kibble bits) is moved closer to the scale/food dish 110 or into the scale/food dish 110. This may be accomplished, for example, by operating the conveyer belt motor 104. In an alternative embodiment, food may be initially moved into a scale that is separate from the food dish, wherein the food in the scale is subsequently placed into the food dish once the threshold has been reached. Operating the belt motor illustratively moves any food on the conveyer belt 106 towards the scale/food dish 110. For instance, any food placed in the illustrative food holder 102 that makes contact with the zo conveyer belt 106 (or that rests on other food on the conveyor belt) would be food that is moved by the conveyer belt. As mentioned above, as food is moved towards the food dish, the food may illustratively come into contact with narrowing buffers 108 directing the food in a reduced flow manner, e.g., single-file, to better control the amount of food advancing into the food dish at any single point in time.

In one embodiment, each time any amount of food is added to the food dish, the procedure may advance to step 410 (i.e., a feedback loop). This procedure may be repeated numerous times to better control the amount of food moved into the dish. Alternatively, the procedure may be repeated depending on the movement of the conveyer belt, rather than in response to additional food entering the food dish (e.g., start belt, stop belt, measure food, determine if threshold met, start belt, stop belt, measure food, determine if threshold is met, etc.). However, in another embodiment, the procedure may also wait to proceed to step 420 until a first predefined weight/amount of food is currently in the food dish. This may speed up the dispensing process. For example, if the threshold is 30 kibble bits, it may be faster to wait until the weight of the food is, for instance, 10 kibble bits from the threshold. This way, the procedure may not take as long as if the process were repeated for every individual kibble bit that is advanced into the food dish. Alternatively, the conveyer belt or other dispensing means may operate at a faster or slower rate depending on e.g., the (current) amount of food in the food dish.

Alternatively, if it is determined that the threshold has been met, then the procedure advances to step 440 where, in response, the illustrative conveyer belt stops moving additional food into the food dish 110. While stopping the conveyer belt prevents more food from entering the food dish in one embodiment of the present invention, it is contemplated that other means may be used to block food from entering the food dish. For example, a barrier (not shown) may be placed in between the food and the food dish once the threshold is met. The procedure then completes in step 450.

While embodiments of the invention are described as measuring the food using a scale, it is contemplated that other means for may be used to measure the food, such as a counter system. The scale may be configured using conventional means which is well known to those skilled in the art. Additionally, the scale may be configured to provide (e.g., through a feedback system) data of the scale to a processor 103 or other computer means to realize the benefits of the present invention. The processor 103 may illustratively be configured to operate the illustrative belt motor 104, and therefore the conveyer belt 106, in response to the determination that either the threshold has been met or the threshold has not been met. For example, if the scale shows that more food is needed to meet the threshold, the processor or other device may execute program instructions to activate the belt motor to advance food on the conveyer belt toward the food dish 110.

Advantageously, the use of tailoring a diet to individual pets in conjunction with the use of such precise measuring and dispensing of food will allow a pet owner to effortlessly (e.g., "set it and forget it") and accurately regulate the diet of their pets more precisely to achieve their dietary needs, regardless if there are multiple pets, multiple pet types, special dietary needs, etc. In turn, the required daily supervision, time, and guessing work about how much food should be served and how often is alleviated from the pet owner and the healthy eating habit of the pet is nearly fully automated and better provided.

The foregoing description has been directed to specific embodiments of this invention. It will be apparent, however, that other variations and modifications may be made to the described embodiments, with the attainment of some or all of their advantages. Accordingly, this description is to be taken only by way of example and not to otherwise limit the scope of the invention. Therefore, it is the object of the appended claims to cover all such variations and modifications as come within the true spirit and scope of the invention.

What is claimed is:

1. A system configured to dispense ingestible items to one or more pets, comprising:
    one or more processors configured to determine a predefined weight of the ingestible items to be dispensed into at least one pet food container during a given time interval based on at least one of a variable about the one or more pets and a variable about the ingestible items, wherein the at least one pet food container is configured to measure a current weight of ingestible items within the at least one pet food container;
    the one or more processors further configured to determine whether the current weight is within a threshold weight range of the predefined weight;
    in response to determining that the current weight is not within the threshold weight range of the predefined weight, moving means configured to move one or more ingestible items into the at least one pet food container;
    in response to moving the one or more ingestible items into the at least one pet food container, the at least one pet food container further configured to measure a new current weight of the ingestible items within the at least one pet food container and the one or more processors further configured to determine whether the new current weight is within the threshold weight range of the predefined weight; and
    the moving means further configured to prevent additional ingestible items from moving into the at least one pet food container during the given time interval in response to determining that the new current weight is within the threshold weight range of the predefined weight.

2. The system of claim 1 wherein the variable about the ingestible items comprises a type of the ingestible items.

3. The system of claim 1 further comprising a memory configured to keep track of at least one of the variables, and wherein the one or more processors is further configured to adjust the predefined weight in response to a change in the variables.

4. The system of claim 1 wherein at least one of the variables is pre-loaded in the memory.

5. The system of claim 1 further comprising a user interface configured to manually receive at least one of the variables.

6. The system of claim 1 wherein the at least one pet food container is configured as a scale.

7. The system of claim 1 further comprising:
    a detector configured to grant access to the at least one pet food container in response to a first device detected within a predefined distance to the at least one pet food container, the detector further configured to prevent access to the at least one pet food container in response to the first device being undetected within the predefined distance to the at least one pet food container.

8. The system of claim 1 further comprising a narrowing path configured to direct the one or more ingestible items into the at least one pet food container.

9. The system of claim 1 further comprising a conveyer belt as the moving means configured to move the one or more ingestible items into the at least one pet food container.

10. A system configured to determine an amount of ingestible items to transfer to at least one pet food container, comprising:
    one or more processors configured to execute one or more processes; and
    one or more computer memories configured to store one or more variables about the ingestible items to be transferred to the at least one pet food container, at least one of the computer memories configured to maintain one or more variables about a pet, and at least one of the computer memories configured to store a process of the one or more processes executable by the one or more processors, the process when executed operable to:
        determine a first weight of the amount of ingestible items to transfer to the at least one pet food container, wherein the first weight is determined using at least one of the one or more variables about the ingestible items and at least one of the one or more variables about the pet;
        determine a second weight, wherein the second weight is a current weight of ingestible items previously transferred to the at least one pet food container that remain in the at least one pet food container; and
        transfer the amount of ingestible items to the at least one pet food container during a given time interval, wherein the amount of ingestible items to be transferred to the at least one pet food container is equal to the first weight minus the second weight.

11. The system of claim 10 wherein the process when executed is further operable to adjust the first weight in response to a change in at least one of the one or more variables.

12. The system of claim 10 further comprising a user interface configured to manually receive at least one of the one or more variables.

13. The system of claim 10 wherein the at least one pet food container comprises a scale configured to communicate the second weight to at least one of the one or more processors.

14. A system configured to determine an amount of ingestible items to transfer to a container, comprising:
    a computer configured to store at least one of a first variable about an ingestible item and a second variable about an animal that is to ingest the ingestible item;
    wherein the computer is further configured to determine the amount of ingestible items to transfer to the container, wherein the amount of ingestible items to transfer to the container is determined with at least one of the first variable about the ingestible item and the second variable about the animal that is to ingest the ingestible item;
    wherein the computer is further configured to determine that a second amount of ingestible items is left over in the container;
    wherein the computer is further configured to adjust the amount of ingestible items to transfer by subtracting the second amount of ingestible items left over in the container from the amount of ingestible items to transfer to the container; and
    wherein the computer is further configured to transfer the adjusted determined amount of ingestible items to the container.

15. The system of claim 14 wherein the second amount of ingestible items is left over from a previous feeding interval.

16. The system of claim 14 wherein the computer comprises a processor.

17. The system of claim 14 wherein the first variable about the ingestible item comprises a type of the ingestible item.

18. The system of claim 14 wherein the second variable about the animal comprises a species of the animal.

19. The system of claim 14 wherein the second variable about the animal comprises an age of the animal.

20. The system of claim 14 wherein the computer is further configured to adjust the amount of ingestible items to transfer to the container in response to a change in the second variable.

21. The system of claim 19 wherein the computer is further configured to adjust the amount of ingestible items to transfer to the container in response to a change in the age of the animal.

22. The system of claim 20 wherein the computer is configured to adjust the amount of ingestible items without user interaction in response to the change.

23. The system of claim 14 wherein the computer comprises a scale, wherein the container comprises the scale.

24. The system of claim 14 wherein at least one of the first and second variables is pre-loaded in the computer.

25. The system of claim 14 further comprising a user interface of the computer configured to manually receive at least one of the first and second variables.

26. The system of claim 14 further comprising:
a detector configured to grant access to the container in response to a first device detected within a predefined distance to the container, the detector further configured to prevent access to the container in response to the first device being undetected within the predefined distance to the container.

27. The system of claim 14 wherein the computer is further configured to determine the amount of ingestible items to transfer to the container according to an overriding user input.

28. The system of claim 14 wherein at least one of the first and second variables is downloaded via an internet connection.

* * * * *